(12) United States Patent
Haaheim

(10) Patent No.: US 10,082,126 B2
(45) Date of Patent: Sep. 25, 2018

(54) WAVE ENERGY CONVERSION APPARATUS

(71) Applicant: HAAHEIM INVENT, Billingstad (NO)

(72) Inventor: Øyvind Haaheim, Billingstad (NO)

(73) Assignee: Haaheim Invent, Billingstad (NO)

( * ) Notice: Subject to any disclaimer, the term of this patent is extended or adjusted under 35 U.S.C. 154(b) by 162 days.

(21) Appl. No.: 15/304,453

(22) PCT Filed: Apr. 15, 2015

(86) PCT No.: PCT/EP2015/058166
§ 371 (c)(1),
(2) Date: Oct. 14, 2016

(87) PCT Pub. No.: WO2015/158773
PCT Pub. Date: Oct. 22, 2015

(65) Prior Publication Data
US 2017/0037828 A1    Feb. 9, 2017

(30) Foreign Application Priority Data
Apr. 16, 2014    (EP) .................... 14164860

(51) Int. Cl.
| | |
|---|---|
| *F03B 13/10* | (2006.01) |
| *F03B 13/12* | (2006.01) |
| *F03B 13/16* | (2006.01) |
| *F03B 13/18* | (2006.01) |
| *F03B 13/20* | (2006.01) |
| *B63B 35/44* | (2006.01) |

(Continued)

(52) U.S. Cl.
CPC .............. *F03B 13/16* (2013.01); *B63B 35/44* (2013.01); *B63H 19/02* (2013.01); *F03B 13/188* (2013.01); *F03B 13/20* (2013.01); *H02K 7/1876* (2013.01); *B63B 2035/4466* (2013.01); *F05B 2220/707* (2013.01); *F05B 2240/93* (2013.01); *Y02E 10/38* (2013.01)

(58) Field of Classification Search
CPC ........ F03B 13/16; F03B 13/188; F03B 13/20; B63B 35/44; B63H 19/02; H02K 7/1876
USPC ..................................... 290/42, 53
See application file for complete search history.

(56) References Cited

U.S. PATENT DOCUMENTS

| | | | | |
|---|---|---|---|---|
| 3,961,863 A | * | 6/1976 | Hooper, III | ........... F03B 13/188 |
| | | | | 290/42 |
| 4,098,084 A | * | 7/1978 | Cockerell | ............... F03B 13/20 |
| | | | | 417/332 |

(Continued)

*Primary Examiner* — Tulsidas C Patel
*Assistant Examiner* — Thomas Quigley
(74) *Attorney, Agent, or Firm* — Mattingly & Malur, PC

(57) ABSTRACT

The present invention relates to a wave energy conversion apparatus for converting wave energy into a power output, comprising a floatable compliant vessel having a plurality of linear generators having ends which are interconnected at a plurality of pivot joints to provide a compliant frame structure, the plurality of linear generators being configured to produce a power output by being respectively compressed and elongated changing the relative positions of the pivot joints, an outer flexible membrane supported by and enclosing the compliant frame structure thereby defining an inner space of the floatable compliant vessel, and a power circuit arranged within the inner space and operationally connected to the linear generators to receive the power output generated by the linear generators.

19 Claims, 18 Drawing Sheets

(51) Int. Cl.
 *B63H 19/02* (2006.01)
 *H02K 7/18* (2006.01)

(56) References Cited

U.S. PATENT DOCUMENTS 4,686,377 A * 8/1987 Gargos ................... F03B 13/20
 290/42
2015/0203183 A1 * 7/2015 Ambs .................. G10K 11/346
 60/495

* cited by examiner

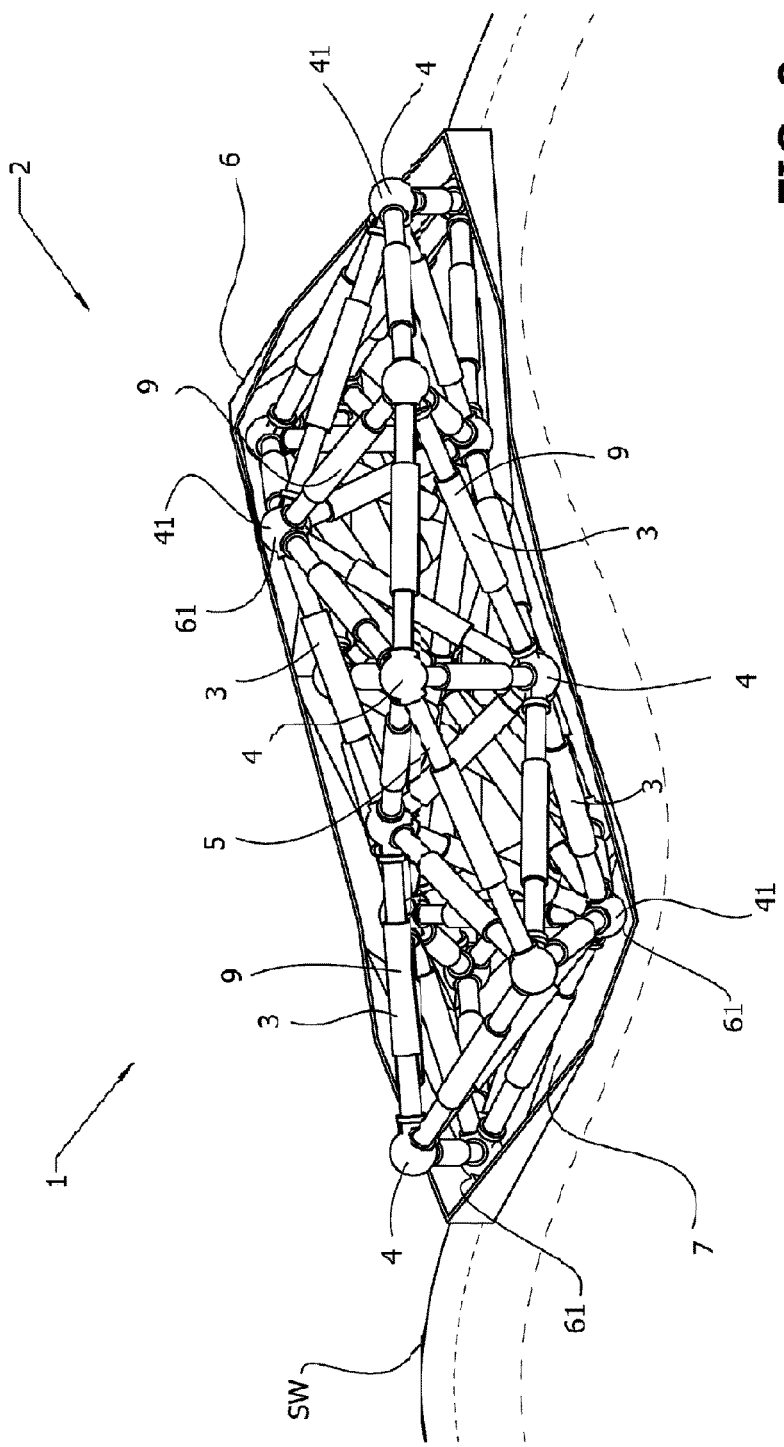

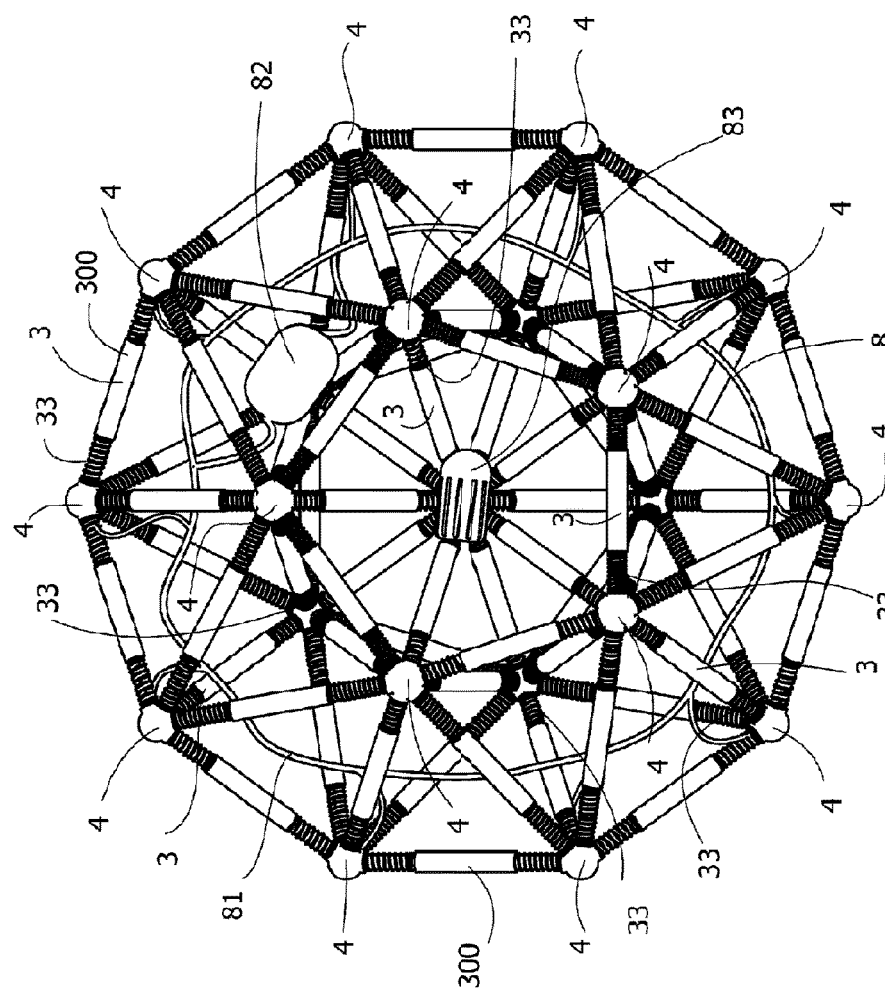

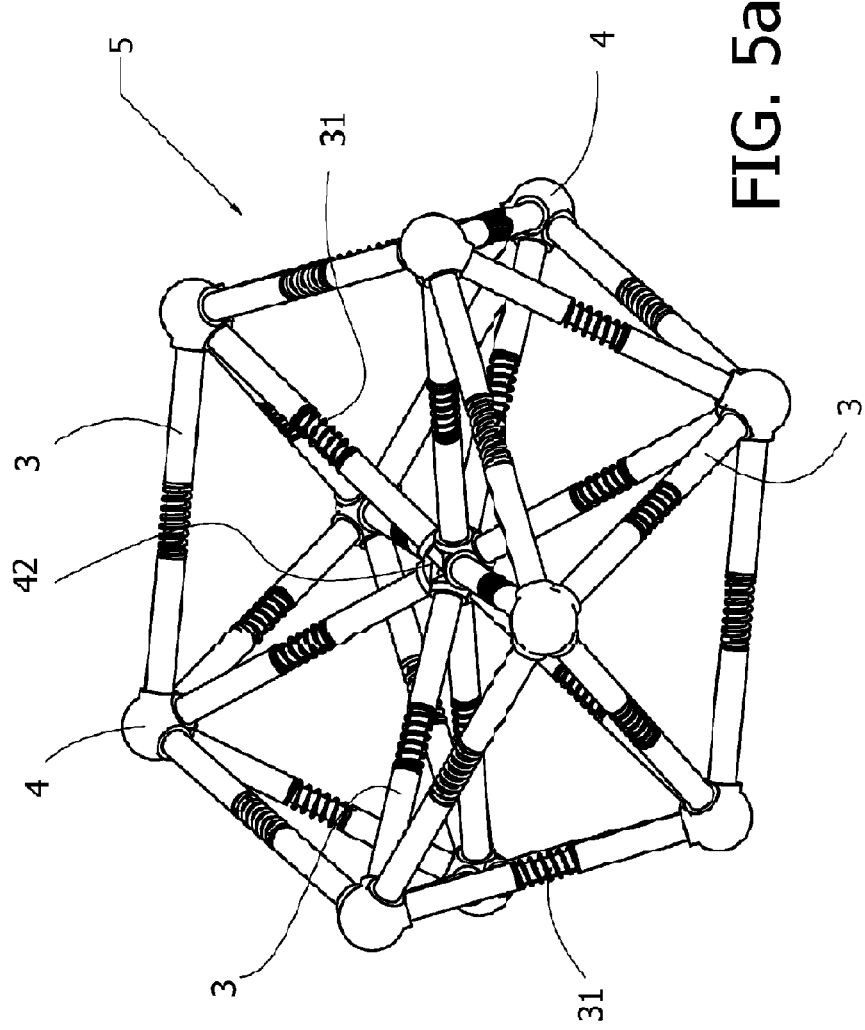

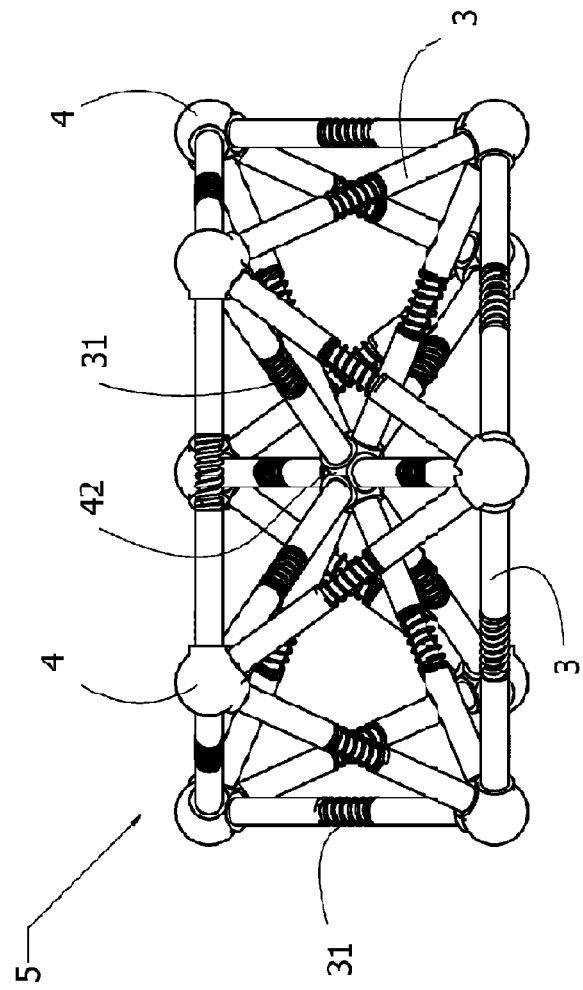

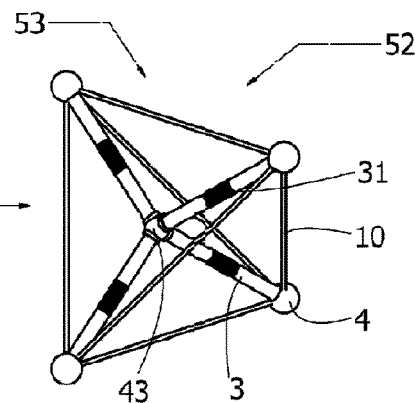
FIG. 7b
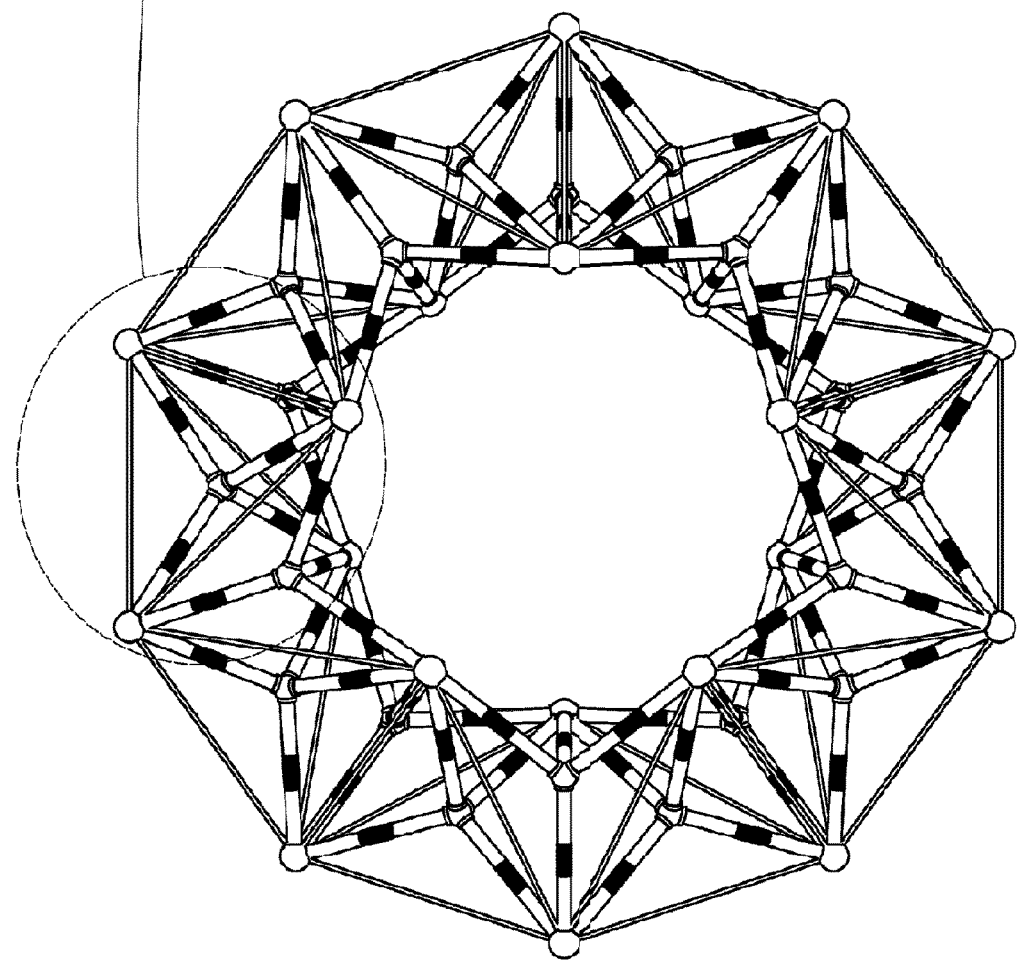

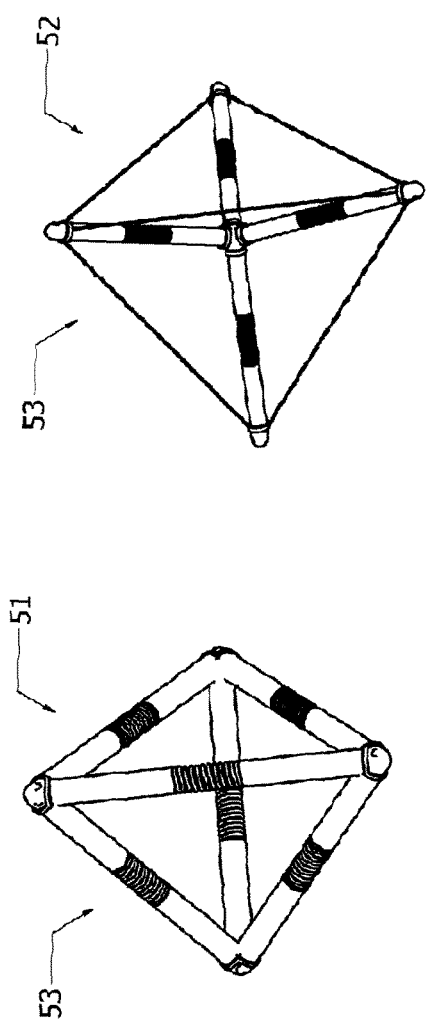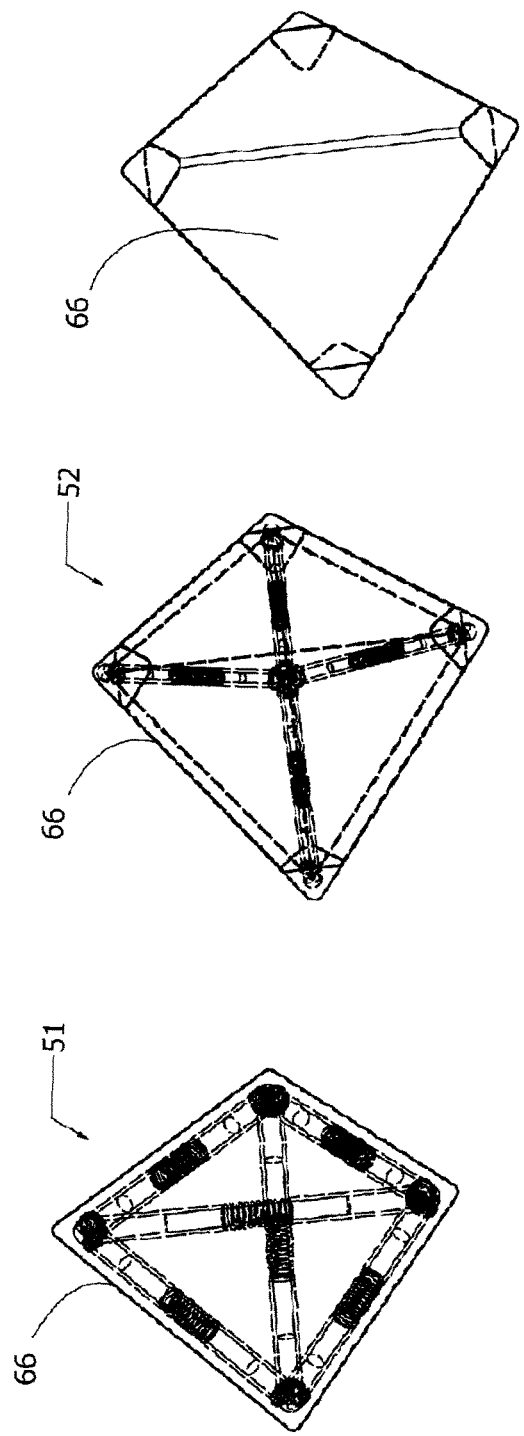
FIG. 9

WAVE ENERGY CONVERSION APPARATUS

FIELD OF THE INVENTION

The present invention relates to a wave energy conversion apparatus for converting wave energy into a power output, comprising; a semi-submersible floatable compliant vessel having a plurality of linear generators having ends which are interconnected at a plurality of pivot joints to provide a compliant frame structure, the plurality of linear generators being configured to produce a power output by being respectively compressed and elongated thereby changing the relative positions of the pivot joints, an outer flexible membrane supported by and enclosing the compliant frame structure thereby defining an inner air filled space of the floatable compliant vessel, and a power circuit arranged within the inner space and operationally connected to the linear generators to receive the power output generated by the linear generators. The present invention further relates to a system for converting wave energy and use of a wave energy conversion apparatus.

BACKGROUND OF THE INVENTION

Ocean wave energy is a field of great interest worldwide due to its renewable character, widespread availability and great potential as a future energy source. It is well known that ocean waves hold the highest energy density compared to other major renewable energy sources such as wind and solar energy. Over the years there has been a wide variety of attempts to harvest this energy in a reliable and economically viable manner. The objective is to convert the wave energy into a more useful energy form such as electricity.

Numerous wave energy conversion systems can be found based on varying technical principles. Some systems operate on the principle of an oscillating water column, exploiting the displacement of air due to the rise and fall of the water level. Other systems physically capture the water of an incoming wave in a reservoir and exploit the potential energy of the water as it returns to the sea. Yet other systems consist of bodies which movement is exited by the waves, and the movement relative to a point or body can be exploited. Wave energy conversion systems can be fixed to the shore, be situated near the shore, while others are located offshore.

One of the main challenges of all wave energy conversion systems is the energy conversion efficiency, which directly relates to the cost of generating power. If the efficiency is low and the cost per produced kWh electricity is too high, the technology cannot compete with power delivered from other energy sources.

A disadvantage of many existing wave energy converters is that they are optimized for a small range of wave amplitudes, wavelengths and frequencies and to one specific direction of the incoming waves. However, the irregular nature of ocean waves and changing conditions necessitates wave energy converters that are able to handle a large variety of wave parameters, in order to maintain a continuously high energy conversion efficiency, and thereby having a high profitability.

Another challenge with wave energy converters is that they often are installed offshore in a harsh environment exposed to corrosive salt water and extreme weather conditions. Designing structures for these severe conditions can be expensive and difficult, and existing wave energy converters often fail and break. Furthermore, their offshore location complicates and increases the costs of installation, maintenance and repair.

Hence, an improved wave energy conversion apparatus would be advantageous, and in particular, a wave energy conversion apparatus with a high energy conversion efficiency over a wide range of wave parameters adapted to exploit waves from multiple directions.

OBJECT OF THE INVENTION

It is an object of the present invention to provide a wave energy conversion apparatus that wholly or partly overcome the above disadvantages and drawbacks of the prior art. More specifically, it is an object to provide an efficient wave energy conversion apparatus adapted to exploit the energy of waves of varying amplitudes, lengths and frequencies and coming from multiple directions.

SUMMARY OF THE INVENTION

Thus, the above described object and several other objects are intended to be obtained in a first aspect of the invention by providing a wave energy conversion apparatus for converting wave energy into a power output, comprising: a semi-submersible floatable compliant vessel comprising: a plurality of linear generators having ends which are interconnected at a plurality of pivot joints to provide a compliant frame structure, the plurality of linear generators being configured to produce a power output by being respectively compressed and elongated changing the relative positions of the pivot joints, an outer flexible membrane supported by and enclosing the compliant frame structure thereby defining an inner air filled space of the floatable compliant vessel, a power circuit arranged within the inner space and operationally connected to the linear generators to receive the power output generated by the linear generators, and wherein the floatable compliant vessel is adapted to be manipulatable by the action of waves acting on the outer flexible membrane between a steady-state condition wherein the linear generators are in neutral positions and a manipulated condition wherein at least some of the linear generators are compressed or elongated, and wherein the floatable compliant vessel is provided with spring back means constantly forcing the linear generators towards their neutral positions and thus the floatable compliant vessel towards the steady-state condition.

The invention is particularly, but not exclusively, advantageous for obtaining a wave energy conversion apparatus that efficiently converts wave energy from waves of varying sizes and waves coming from multiple directions. Further, the floatable compliant vessel is a self-supporting structure wherein the energy conversion takes place decentrally in each of the linear generators. The energy conversion means also ensures the structural integrity of the construction, hence no additional support structure is necessary. The external forces acting on the floatable compliant vessel is hereby distributed throughout the construction and the construction becomes very dynamic. As the construction does not have one particular mode of operation or preferred pattern of movement, wave energy may be generated from waves of varying sizes and waves coming from multiple directions. This contributes to an efficient power production as many different types of waves can be converted efficiently. Also, the construction becomes more robust, both towards wear and tear but also with regard to sudden or momentary large impacting forces. Still further, the dynamic character of the compliant frame structure is supported by the spring back means constantly forcing the linear generators towards their neutral position. Hereby the compliant vessel constantly moves under the influence of the waves, but without ending up in undesirable extreme positions, which may be destructive or reduce the efficiency of the energy conversion. Further, the structure keeps itself buoyant, and does not rely on other structures such as flotation units to stay afloat By semi-submersible is meant that the floatable compliant vessel during normal operation will be partly submerged, having part of the construction below the water surface and part of the construction above the water surface.

Further, by a linear generator is meant any type of device or actuator generating a power output based on linear compression- or tensile forces acting on the device. Exemplary embodiments may be linear alternators generating an electrical power output or a linear hydraulic pump generating a power output in the form of a pressurised hydraulic fluid.

Also, a restoring force of the spring back mechanism may be proportional to the compression or elongation stroke of the linear generator. By providing at least some of the linear generators with a spring back mechanism, the linear generators may oscillate about their neutral position, similar to a swinging pendulum oscillating about its equilibrium position.

Further, the outer flexible membrane is watertight and encloses the compliant frame structure so that water is prevented from entering the inner air filled space of the floatable compliant vessel, thereby maintaining its buoyancy and a dry environment for equipment located in the inner space of the floatable compliant vessel.

Furthermore, the inner space of the floatable compliant vessel may be substantially air tight and depressurised whereby the compliant frame structure is subject to a compression force by the outer flexible membrane urging the linear generators into a neutral position. Providing a negative pressure relative to the atmospheric pressure inside the floatable compliant vessel, is a way of adjusting the compression and/or elongations of the linear generators, and can thus be used to control the steady-state condition of the floatable compliant vessel. Further, by adjusting the pressure inside the inner space, the manipulability of the compliant vessel may be controlled.

Additionally, each of the linear generators may be connected with multiple other linear generators at the pivot joints to provide a repetitive closed frame structure. Also, an outer contour of the frame structure seen from above may have the shape of a polygon, preferably a 5-15 sided polygon, more preferable the shape of a decagon.

According to still another aspect of the invention, the linear generators may be linear hydraulic pumps generating a power output in the form of a pressurised hydraulic fluid which is fed into the power circuit.

Moreover, the power circuit may comprise a hydraulic pipe system in fluid communication with each of the linear hydraulic pumps, the hydraulic pipe system being configured to supply a hydraulic fluid to an inlet of each of the linear hydraulic pumps and to receive a pressurised hydraulic fluid from an outlet of each of the linear hydraulic pumps. The movement of the linear hydraulic pump pressurises the circulating hydraulic fluid, both on compression and elongation, and the fluid pressure on the outlet is higher than at the inlet.

The power circuit may further comprise a hydraulic accumulator for temporary storing and smoothing the circulating hydraulic fluid pressurised by the linear hydraulic pumps.

Still further, the power circuit may comprise a power conversion system, such as a hydraulic generator, adapted to convert the pressurised hydraulic fluid into an electric power output.

Additionally, the power conversion system may be arranged in the inner space of the floatable compliant vessel. Alternatively, the power conversion system may be arranged remotely from the floatable compliant vessel.

According to another aspect of the invention, the linear generators may be linear alternators generating an electrical power output.

Further, the electric power output generated by the power conversion system or directly by the linear generators may be transferred to shore through sub-sea transmission lines and connected to the electric grid. Necessary adaptation means such as frequency converters may be used to meet the requirement of the grid system operator.

Still further, the wave energy conversion apparatus described above may comprise a central pivot joint adapted for being fixed to an external structure. Such central pivot joint may for example be used for fixating the wave energy conversion apparatus to the seabed, to a pier or a buoy.

Moreover, the outer flexible membrane may be displaceably arranged in relation to the compliant frame structure, allowing points of contact between the compliant frame structure and the outer flexible membrane to shift. Also, at least some of the pivot joints may comprise ball-shaped supporting surfaces constituting points of contact between the compliant frame structure and the outer flexible membrane. In addition, the outer flexible membrane may comprise multiple sections of elasticity and/or flexibility.

According to one aspect of the invention, at least some of the plurality of linear generators may be arranged in the frame structure defining a plurality of first tetrahedron modules.

According to another aspect of the invention, at least some of the plurality of linear generators is arranged in the compliant frame structure in a tetrahedral geometry having groups of linear generators extending from a common pivot joint. Additionally, an angle between two linear generators extending from the same common pivot joint may be approximately 109 degrees. The linear generators thereby form a frame structure similar to that of carbon atoms in a diamond lattice. Further, this structure minimizes unwanted shear and bending forces on the linear generators since they are aligned so that incoming waves will not act perpendicular to the longitudinal axis of the linear generators.

Still further, the groups of linear generators extending from the common pivot joint may define corners of a tetrahedron and a plurality of substantially rigid thread elements may extend between these corners, thereby defining a plurality of second tetrahedron modules. The rigid thread elements have the functionality of controlling the mutual orientation and tension of the linear generators.

The geometrical arrangement is such that the exciting forces of the incoming waves are distributed as axial forces in the linear generators throughout the frame structure, similar to how forces are distributed in a truss work, which members only experience compression and tension.

According to still another aspect of the invention, each of the first and/or second tetrahedron modules may define a frame module provided with a module membrane arranged to enclose each of the first and/or second tetrahedron modules, and the compliant frame structure may comprise a plurality of interconnected frame modules.

The wave energy conversion apparatus described above may further comprise buoyancy-controlling means associated with the floatable compliant vessel for controlling the buoyancy of the floatable compliant vessel. For example, the buoyancy controlling means may be in the form of ballast tanks.

Additionally, the wave energy conversion apparatus described above may further comprise a mooring system to secure the wave energy conversion apparatus against drifting.

The wave energy conversion apparatus may also comprise a control system for monitoring and controlling the operational parameters of the wave energy conversion apparatus.

The invention further relates to a system for converting wave energy into a power output, comprising: a plurality of wave energy conversion apparatuses, and a common power accumulation system operably connected to the plurality of wave energy conversion apparatuses and adapted to accumulating the power output of the plurality of wave energy conversion apparatuses.

In another aspect the system may further comprise a common power conversion system operably connected to the plurality of wave energy conversion apparatuses and adapted to convert the power output of the plurality of wave energy conversion apparatuses into electrical power.

The invention still further relates to the use of a wave energy conversion apparatus as described above, for generating waves by supplying a power input to the linear generators and controlling the mutual elongation and compression of the linear generators.

The aspect of the present invention described above may each be combined with any of the other aspects. These and other aspects of the invention will be apparent from and elucidated with reference to the embodiments described hereinafter.

BRIEF DESCRIPTION OF THE FIGURES

The wave energy conversion apparatus according to the invention will now be described in more detail with regard to the accompanying figures. The figures show ways of implementing the present invention and are not to be construed as being limiting to other possible embodiments falling within the scope of the attached claim set.

FIG. 2a shows the wave energy conversion apparatus of FIG. 1a in a manipulated condition, FIGS. 4a and 4b show, respectively in top and isometric view, one configuration of a compliant frame structure comprising a plurality of linear generators defining first tetrahedron modules, FIGS. 5a and 5b show, respectively side and isometric view, another configuration of a compliant frame structure illustrating a central pivot joint, FIGS. 7b and 7c illustrate how the centre part and the outer part of the compliant frame structure shown in FIG. 7a respectively comprise first and second tetrahedron modules, FIG. 9 illustrates frame modules comprising a modular membrane.

DETAILED DESCRIPTION OF AN EMBODIMENT

Figure 1A:
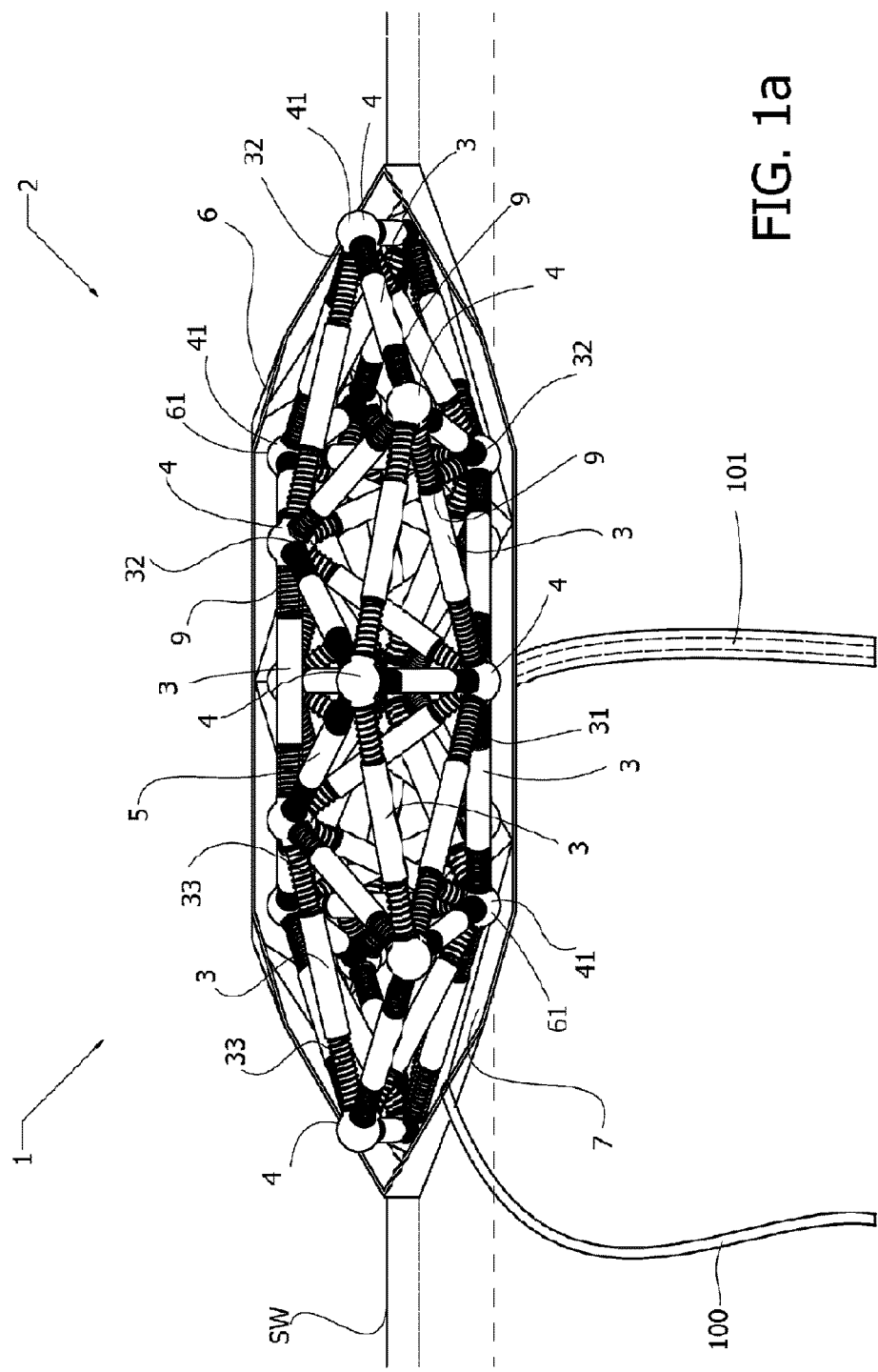
FIG. 1a shows a wave energy conversion apparatus in a steady-state condition with part of the outer flexible membrane excluded for illustrative purposes.
Figure 1B:
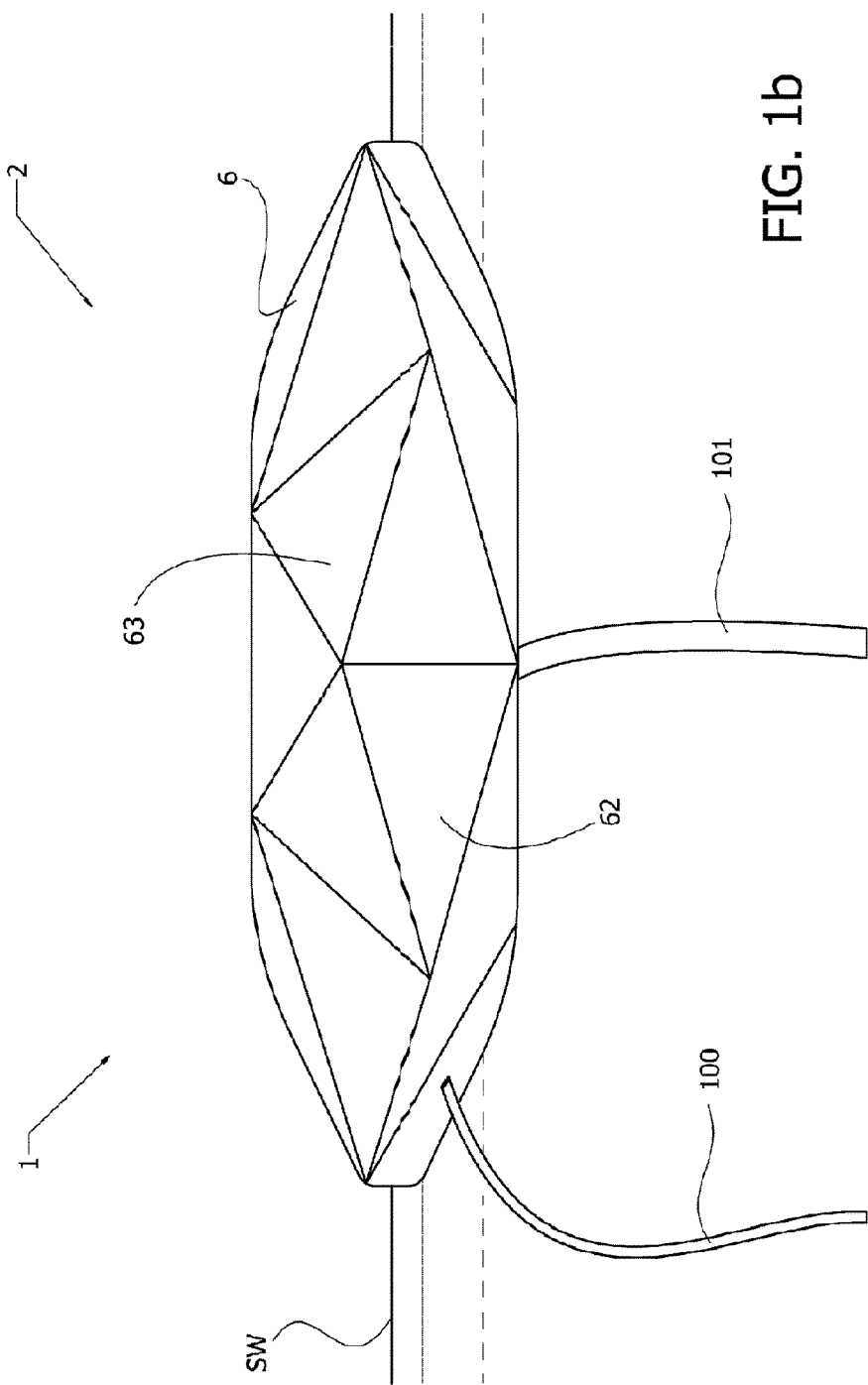
FIG. 1b shows the wave energy conversion apparatus of FIG. 1a with an intact outer flexible membrane.

FIGS. 1a and 1b show a wave energy conversion apparatus 1 according to one aspect of the invention comprising a floatable compliant vessel 2. The floatable compliant vessel is shown to be semi-submerged in the sea SW, and provided with a power transmission line 101 and means of external fixation means 100, such as a mooring system, extending downwards. The floatable compliant vessel 2 comprises a compliant frame structure 5 enclosed by an outer flexible membrane 6. The outer flexible membrane defines an inner air filled space 7 of the floatable compliant vessel and as the outer flexible membrane 6 is supported and stretched by the compliant frame structure 5, a floatable vessel is provided.

The compliant frame structure comprises a plurality of linear generators 3 linked via a plurality of pivot joints 4. The ends 32 of the linear generators are hinged to the pivot joints 4 so that no bending forces are transmitted, allowing the mutual angular orientation of the linear generators and the relative positions of the pivot joints to vary. As will be further described below, the angle between the linear generators may thus change as waves act on the floatable compliant vessel 2 and the forces of the waves are absorbed in the compliant frame structure.

The linear generators 3 are configured to be manipulated between a neutral position and respectively a compressed and an elongated condition when subjected to compression and tension forces. As the linear generators are manipulated a power output is produced, which is transferred to a power circuit 8 shown in FIG. 4a. As both the length of each linear generators and the mutual angle between the linear generators 3 may vary, the compliant frame structure is a dynamic construction having a geometric or spatial layout, which is greatly influenced by external forces, such as atmospheric pressure, hydrostatic pressure, gravity and the ocean waves acting on the floatable compliant vessel. Still referring to FIGS. 1a and 1b, the floatable compliant vessel is shown in a steady-state condition wherein the linear generators are in their neutral position.

Figure 2B:
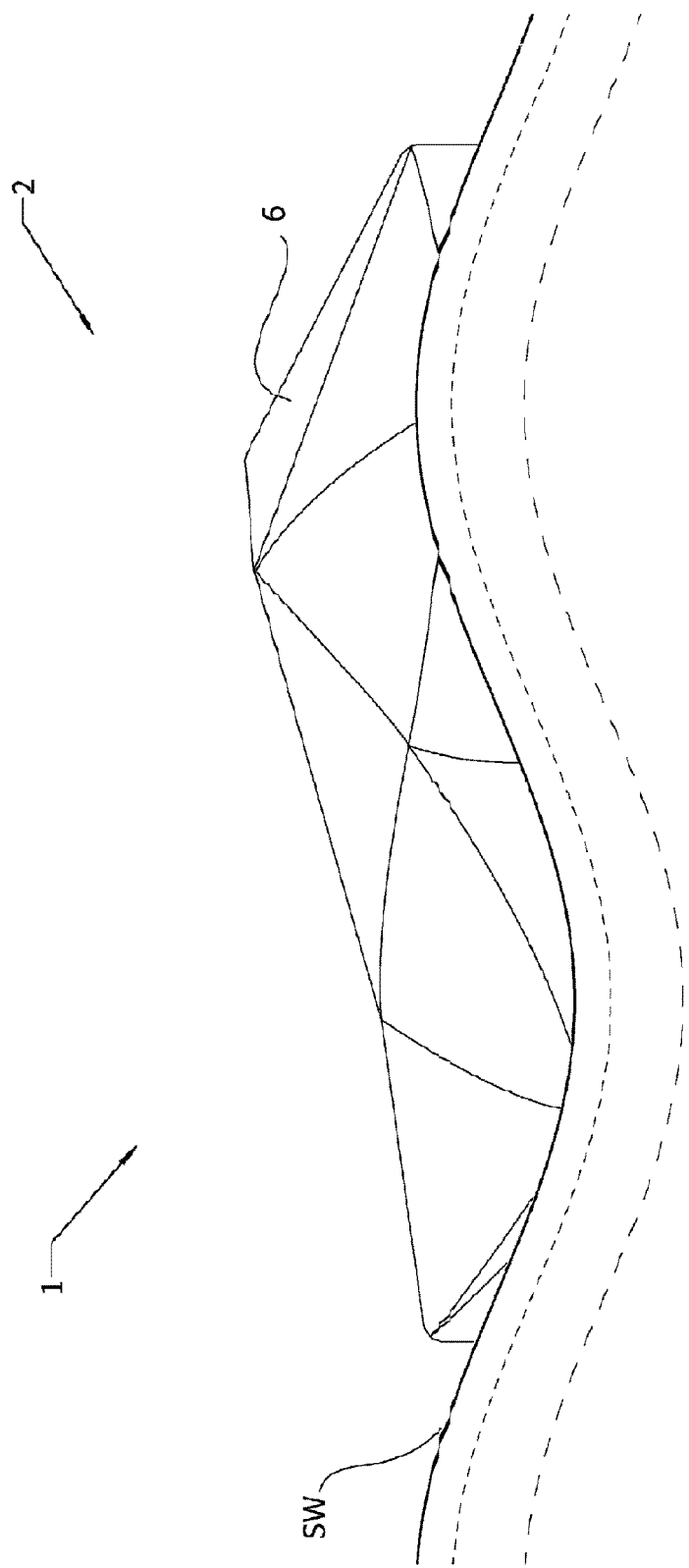
FIG. 2b shows the wave energy conversion apparatus of FIG. 1b in a manipulated condition.

Now referring to FIGS. 2a and 2b, the floatable compliant vessel is shown in a manipulated configuration. In the manipulated configuration, a substantial part of the linear generators 3 are either compressed or elongated and as the floatable compliant vessel is semi-submerged in the sea and constantly manipulated by the waves, the length of and mutual angles between the linear generators constantly change. To support the dynamic character of the wave energy conversion apparatus, the floatable compliant vessel is provided with spring back means 9 constantly forcing the linear generators towards their neutral position and thus the floatable compliant vessel towards the steady-state configuration. Hereby, following the impact of a wave forcing the floatable compliant vessel 2 into a manipulated configuration, the spring back means 9 urge the floatable compliant vessel back towards the steady-state configuration.

Figure 4B:
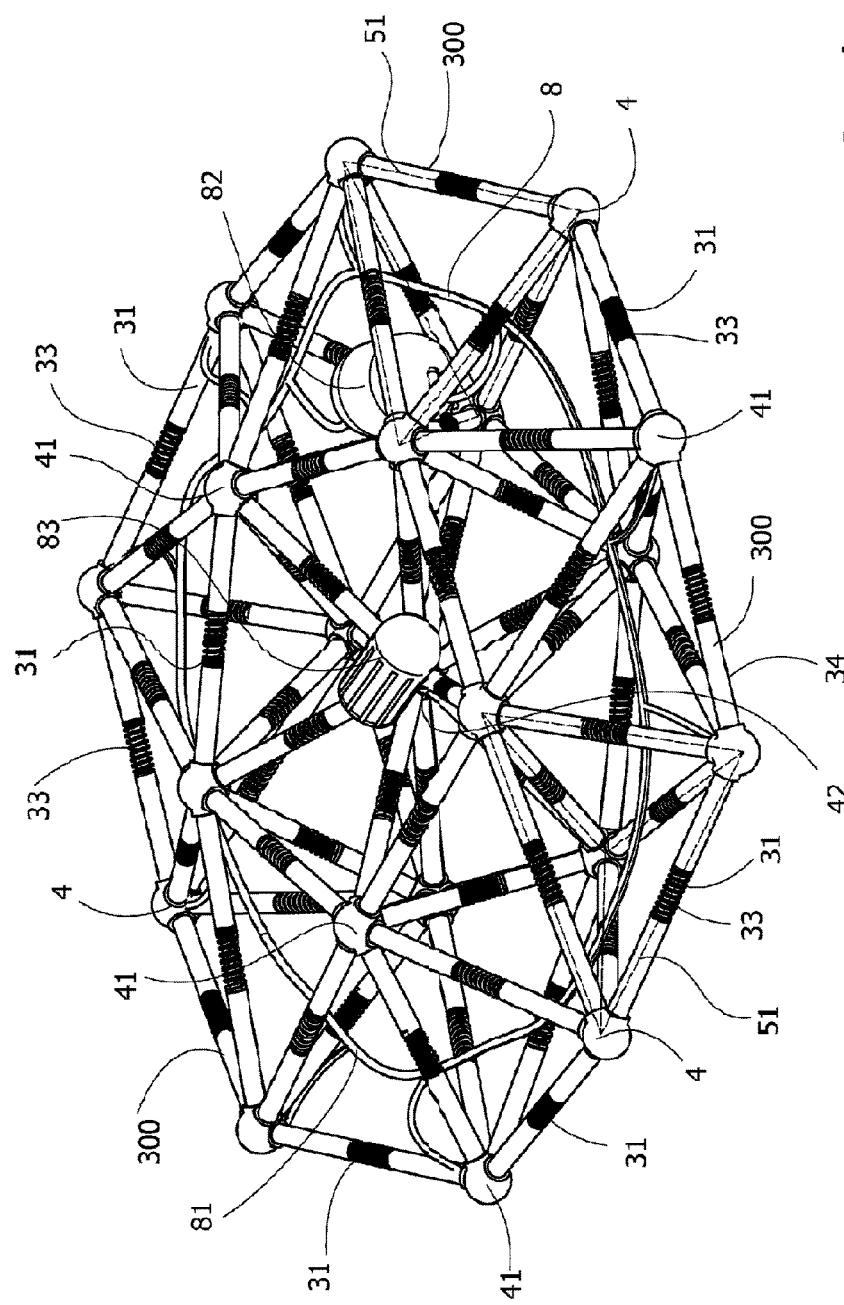

According to one aspect of the invention, the spring back means 9 may be implemented as a spring back mechanism 31 provided in some or all of the linear generators, as best seen from FIG. 4b. This spring back mechanism 31 may be constructed in a number of different ways, e.g. by incorporating a helical spring member into the linear generators, which spring member is compressed when a compression force is applied on the linear generators. The spring member thus dampens the impact of the waves on the floatable compliant vessel by building up potential energy, acting as a mechanical accumulator. The potential energy may subsequently be exploited in the operation of the linear generators for producing power. Hereby, the generation of energy in the linear generators also takes place as a wave has passed the floatable compliant vessel and the generation of power is more evenly distributed. A further advantage in this respect is that destructive large forces and slamming of the floatable compliant vessel may be dampened, consequently contributing to the structural integrity of the wave energy conversion apparatus.

FIGS. 4a and 4b show linear generators in the form of linear hydraulic pumps 300 incorporating spring members 33 in the spring back mechanism 31, as described above.

Figure 8A:
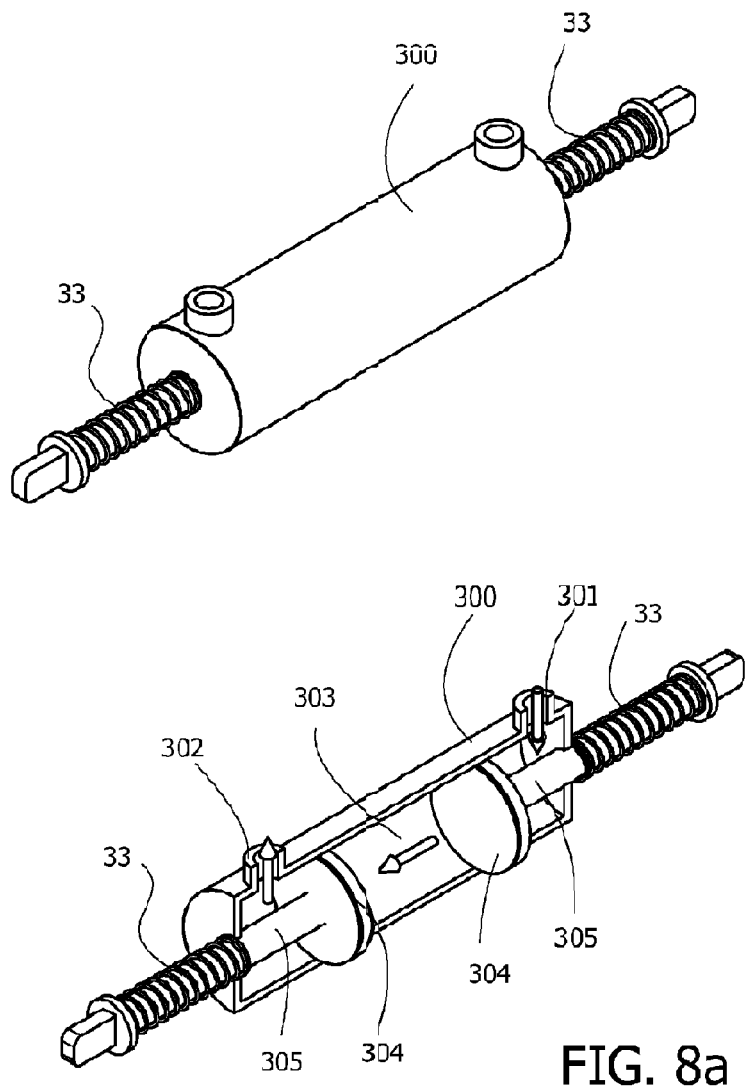
FIGS. 8a and 8b show one exemplary embodiment of a linear hydraulic pump.

Referring to FIG. 8a, in one exemplary embodiment, the linear hydraulic pumps 300 comprise a housing defining a pump chamber 303 wherein two pistons 304 are arranged. The pistons are provided with shafts 305 extending in a longitudinal direction of the linear hydraulic pumps, and the spring members 33 are arranged to be compressed when a compression force is applied to one or both shafts.

Thus, following a compression of the linear hydraulic pump, the spring members force the shafts and thus the pistons away from each other, whereby the linear hydraulic pump move towards the neutral position.

Figure 8B:
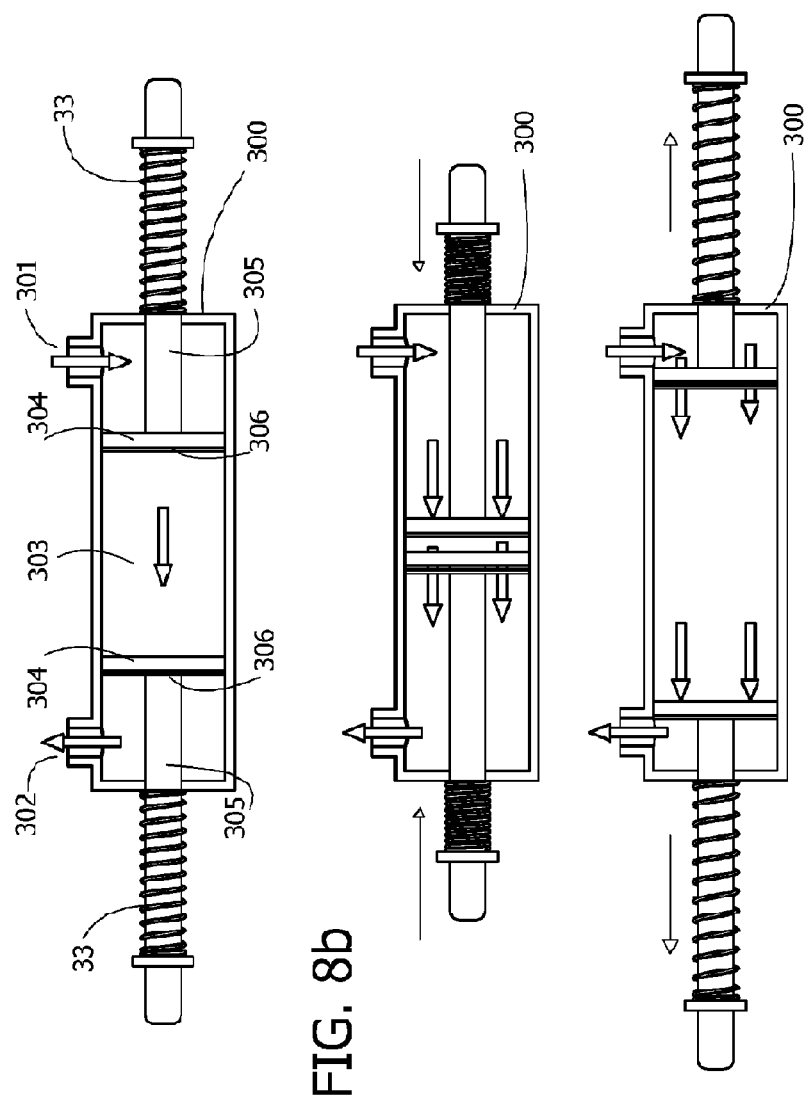

Referring to FIG. 8b, in one exemplary embodiment the pistons are provided with a check valve functionality 306 allowing fluid to flow in one direction only. As the linear hydraulic pump is manipulated, the check valves alternate between a closed state when the piston moves the hydraulic fluid, and an open state when the piston lets the hydraulic fluid pass. At elongation of the linear hydraulic pump, one check valve is closed and the other is open. At compression, the valves switch mode so that the previously closed valve is open and the valve that was open at elongation is now closed. The linear hydraulic pump thus acts as a double acting pump, pressurising and circulating the hydraulic fluid at both stroke directions.

Figure 8C:
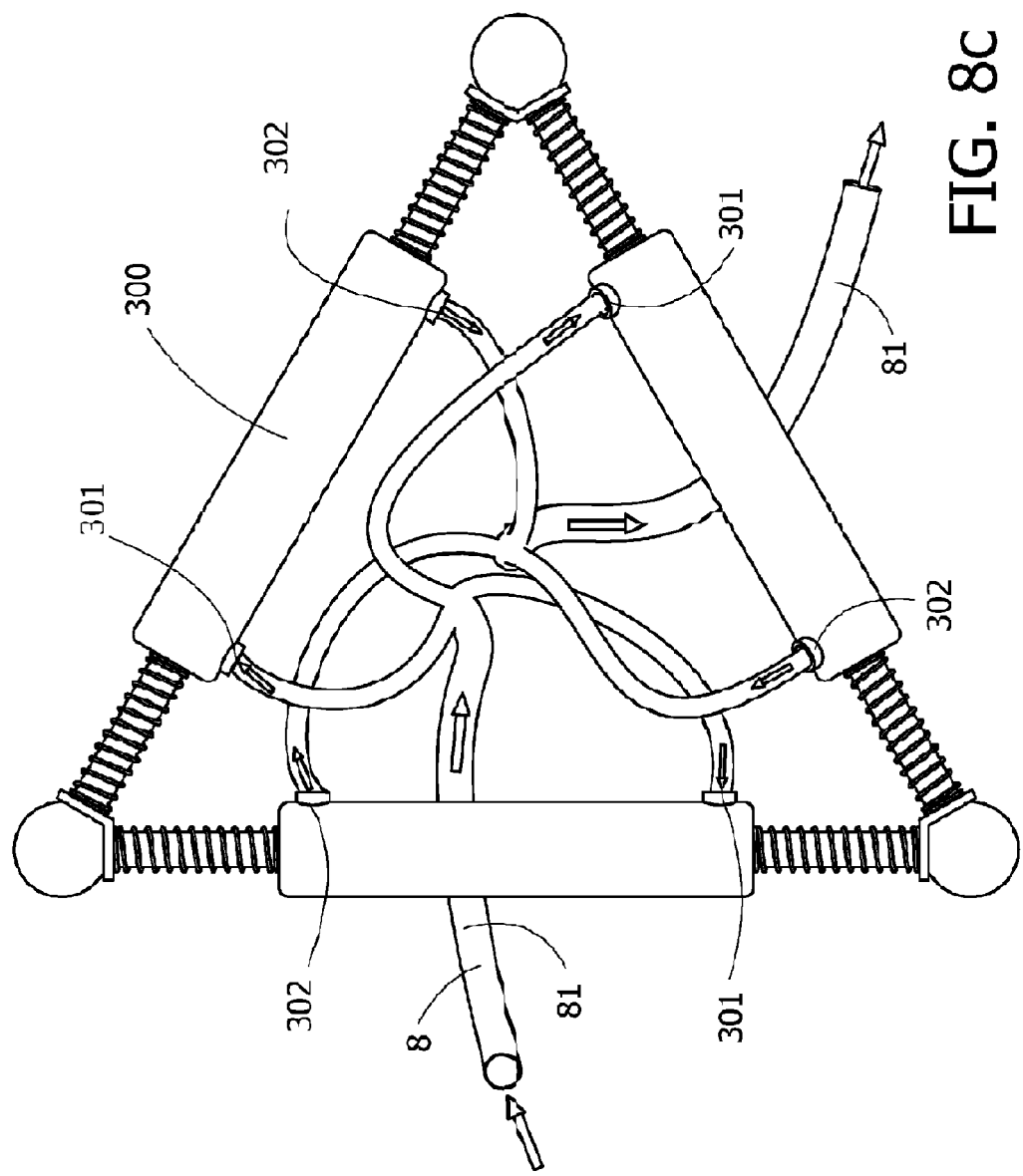
FIG. 8c shows linear hydraulic pumps connected to the hydraulic pipe system.

In the embodiment in FIG. 8b the total volume of the hydraulic fluid in the pump is constant as the linear actuator is elongated or compressed. FIG. 8c shows an exemplary of a part of a compliant frame structure where linear hydraulic pumps 300 are connected to the hydraulic pipe system 81 showing circulation of the hydraulic fluid. As is readily understood by the skilled person, the linear hydraulic pumps may be constructed in a number of other ways without departing from the scope of the invention.

The power circuit of the wave energy conversion apparatus shown in FIGS. 4a and 4b, comprises a hydraulic pipe system 81 in fluid communication with each of the linear hydraulic pumps, a hydraulic accumulator 82 for temporary storing the pressurized hydraulic fluid and a power conversion system 83. The hydraulic accumulator and the power conversion system are shown to be arranged inside the floatable compliant vessel. However, as envisaged by the skilled person, the hydraulic accumulator and the power conversion system may also be arranged fully or partly externally to the floatable compliant vessel.

More specifically, when a linear generator 3 is subjected to an axial force, part of this force will be harvested by the power conversion system through the kinetic energy in the compression/elongation of the linear generator. Another part of the force will be utilized to deform the spring back mechanism 31 where this is present. The spring back mechanism stores potential energy, which later will be exploited as the linear generator returns to its neutral position. Remaining forces that are not exploited by the power conversion system or accumulated by the spring back mechanism, will be forwarded to other linear generators via the pivot joints 4. In this way, the forces will be distributed and harvested throughout the compliant frame structure 5, following the path of least resistance.

Referring to FIG. 8a, as the linear hydraulic pumps are elongated by the waves, a hydraulic fluid is drawn into the pump chamber through and inlet 301 of the pump chamber in fluid communication with the hydraulic pipe system 81 shown in FIG. 4a. In the piston chamber, hydraulic fluid is pressurised by the movement of the pistons, and the pressurised hydraulic fluid leaves the pump chamber through an outlet 302 of the pump chamber in fluid communication with the hydraulic pipe system.

The hydraulic pipe system is part of the power circuit of the floatable compliant vessel and the hydraulic pipe system is connected with the power conversion system 83 adapted to convert the pressurised hydraulic fluid into electrical power. The power conversion system may for example be a turbine or the like suitable for extracting power from a pressurised fluid. The hydraulic fluid leaving the power conversion system is recirculated into the hydraulic pipe system whereby a closed system is provided. The hydraulic fluid may thus be continuously circulated to produce electrical power. As envisaged by the skilled person, the hydraulic pipe system and the power conversion system may be constructed in a number of different ways without departing from the scope of the invention.

Further, the power output from the linear generators may be utilized for other purposes than electricity production, for example pumping seawater or desalinating seawater.

Referring again to FIGS. 1a and 2a, according to one aspect of the invention, the inner space 7 of the floatable compliant vessel is substantially air tight and depressurised. Depressurisation may for example be controlled by providing a pump or other type of vacuum device (not shown) which is operated to remove air from the inner space. By depressurising the inner space 7 the pressure difference causes the compliant frame structure to shrink, resulting in axial compression forces in the linear generators 3 which also leads to compression of the spring back mechanism thus, by controlling the pressure in the inner space, the position of the linear generators may be controlled. Consequently, depressurising the inner space may be used to urge the linear generators into a neutral position where the spring back mechanism is pre-tensioned and the floatable compliant vessel is set in the modified steady-state configuration. With the pre-tension, the linear actuators may be both elongated to a maximum length and compressed to a minimum length from the initial neutral position. Further, when the floatable compliant vessel is depressurised, the volume decreases while the weight remains unchanged, hence changing the density. Thus, the depressurisation can be used as a means to control the buoyancy of the floatable compliant vessel.

Figure 3:
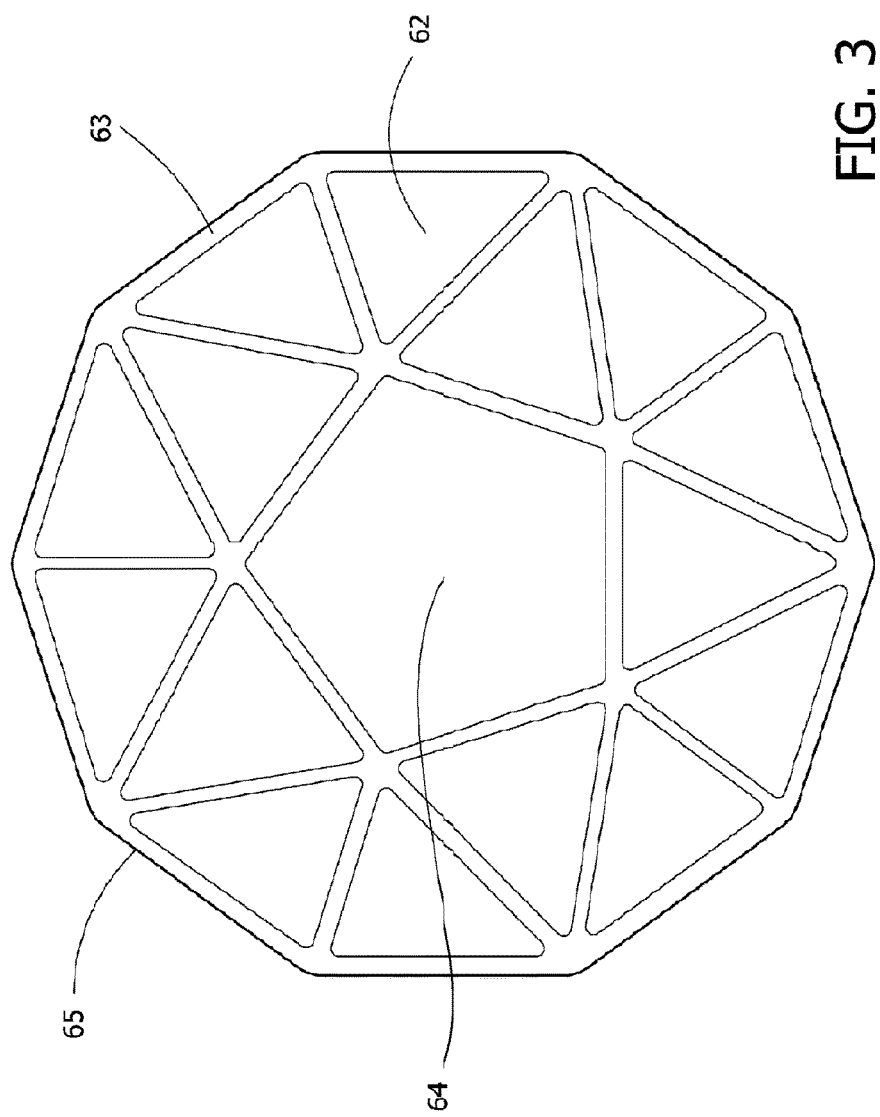
FIG. 3 shows a top view of a wave energy conversion apparatus illustrating multiple sections of the outer flexible membrane.

Referring to FIG. 3, according to one aspect of the invention, the outer flexible membrane 6 could be constructed from a polymer material being flexible but rather inelastic. The membrane will be bent and deformed but not significantly stretched. Thus, as the waves act on the floatable compliant vessel, the forces of the waves are transferred to the compliant frame structure 5 resulting in a change of geometry of the compliant frame structure. The change in geometry or deformation of the compliant frame structure is possible due to the articulated connections between the linear generators and due to the linear generators changing length when subjected to compression- and tensile forces. By the outer flexible membrane being displaceably arranged in relation to the compliant frame structure 5, points of contact 61 between the compliant frame structure and the outer flexible membrane may shift as the geometry of the compliant frame structure changes. The compliant frame structure can thus move relative to the outer flexible membrane and to protect the outer flexible membrane the outer most pivot joints comprise ball-shaped supporting surfaces 41. These supporting surfaces 41 constitute the points of contact 61 between the compliant frame structure and the outer flexible membrane. Further, the outer flexible membrane comprises multiple sections 62, 63, 64. These sections may be constructed from material of varying elasticity and/or flexibility to control the behaviour of the outer flexible membrane and to provide a membrane that supports the desired dynamic nature of the floatable compliant vessel. For example, the spring back means may be partially or fully incorporated into the outer flexible membrane 6. In other embodiments, the outer flexible membrane may be constructed from a uniform material.

Referring again to FIGS. 1a and 1b, the floatable compliant vessel 2 must have the appropriate draught in order to respond optimally to the incoming waves. The floatable compliant vessel will typically be semi-submerged in the ocean and the weight of the displaced volume is equal to the weight of the floatable compliant vessel. The buoyancy of the floatable compliant vessel can be compared to that of a ship by that the linear actuators act as ribs and the membrane as a hull. However the construction is not rigid like a ship. The draught of the floatable compliant vessel is given by the vessel's mass-volume ratio (density) in relation to density of water and its center of gravity. In addition to the total mass of the components in the floatable compliant vessel, ballast may be included. Instead of conventional ballast such as sand or ballast tanks with water, one solution is to incorporate additional mass in the outer flexible membrane 6 or by increasing mass in selected pivot joints 4. Placing mass at the outer membrane for example in form of a chainmail or another type of reinforcement structure can give the floatable compliant vessel advantageous properties. The center of gravity might remain unchanged, while the mass distribution will change, hence changing the moment of inertia and still further the dynamic response of the system. In addition to advantageous inertia properties, the increased weight of the upper part of the outer flexible membrane will act as a vertical force on the compliant frame structure. Weight of the lower part of the outer flexible membrane will pull in the compliant frame structure.

According to one aspect of the invention, the shape of the floatable compliant vessel shall maintain within certain aspect ratios. One undesirable manipulated form is a flattened frame structure (increased width-to-height relation), resulting in a stiffer frame structure which is not so easily manipulated by the action of the waves. If additional weight is included in the lower part of the flexible membrane as previously described, this will act as a downwards pull on the floatable compliant vessel, and hence contribute to prevent such flattening of the frame structure. Another feature that may contribute to maintain the desired aspect ratio of the floatable compliant vessel 2, is the incorporation of a maximum outer circumference 65 of the flexible membrane 6. When the floatable compliant vessel is manipulated by a wave, a maximum outer circumference will constrain the frame structure from expanding horizontally beyond a certain point, thereby enhancing the manipulation in a vertical direction.

The forces, F, acting on the wave energy conversion apparatus can be summarized as follows:

$$F_{total} = F{\text{gravity}} \pm F_{atmospheric\_pressure} + F_{hydrostatic\_pressure} \pm F_{wave\_induced\_forces} + F_{underpressure}$$

All forces are environmental loads, except from the force due to the imposed underpressure inside the floatable compliant vessel. The environmental loads depend on the installation site and the season. How the wave energy conversion apparatus responds to the forces is a result of the properties of the floatable compliant vessel, defined among others by:
  frame structure geometry
  total mass and volume
  mass center and mass distribution
  underpressure
  spring back means
  resistance in the power conversion system (e.g. friction resistance, generator properties)
  properties of joints
  properties of outer flexible membrane The properties must be tuned to interact so that the wave energy conversion apparatus as a whole has a highly dynamic nature, which can be characterized as a "stable instability". This will ensure an efficiently conversion of the incoming waves of a wide range of wave parameters The inner air-filled space 7 of the floatable compliant vessel is shielded from the surrounding environment, i.e. seawater and provides a substantially dry environment. Sensitive equipment may thus be arranged in the inner space and the inner spaces is ideal for gaining access to the structure of the floatable compliant vessel, e.g. for inspection and maintenance purposes.

Additionally, the wave energy conversion apparatus described above may comprise a fixation means 100 to secure the wave energy conversion apparatus against drifting. The fixation means may be designed in a number of ways, for example as a slack mooring where the anchor system does not interfere with the power conversion properties of the floatable compliant vessel.

FIGS. 5a and 5b show a configuration of a compliant frame structure comprising a central pivot joint 42. The central pivot joint may be used for attaching fixation means 100, such as a mooring system, to the floatable compliant vessel. The central pivot point 42 may also be used for fixating the wave energy conversion apparatus directly to a fixed structure such as a pier or an offshore structure. The wave energy conversion apparatus may also comprise a control system for monitoring and controlling the operational parameters. Sensors for measuring temperature, length and positions of linear generators, hydraulic pressure, vibrations, bearing condition, air pressure inside the floatable compliant vessel, electric power output.

As seen from the figure the compliant frame structure may come in a variety of different geometries incorporating fewer or more linear generators 3. For example, the compliant frame structure of a floatable compliant vessel may comprise 40-120 linear generators 3. Also, the pivot joints 4 and linear generators 3 may be of varying size. Smaller linear generators with less resistance, requiring less axial force, and thus smaller waves, to manipulate, may be arranged in the periphery of the compliant frame structure. Similarly, larger generators with larger resistance requiring larger forces, and thus larger waves, may be arranged towards the centre of the compliant frame structure, similar to at tree where the outer branches are the thinnest, while branches are thicker near the log. Hereby the ability of the wave conversion apparatus to exploit waves of varying sizes may be improved even further.

As best seen from FIG. 4b the linear generators 3 of the compliant frame structure may be arranged in the frame structure defining a plurality of first tetrahedron modules 51, as indicated by the dotted lines. Each linear actuator 3 is part of multiple tetrahedron modules, and thus a three dimensional self-repetitive structure is created. The compliant frame structure is a closed structure, which seen from above has the shape of a decagon. It is readily understood by the skilled person that many other shapes may be envisaged without departing from the scope of the invention. The layout of the frame structure may for example be customised according to specific requirements in regard to e.g. manufacturing, storage, transportation or installation.

Figure 6A:
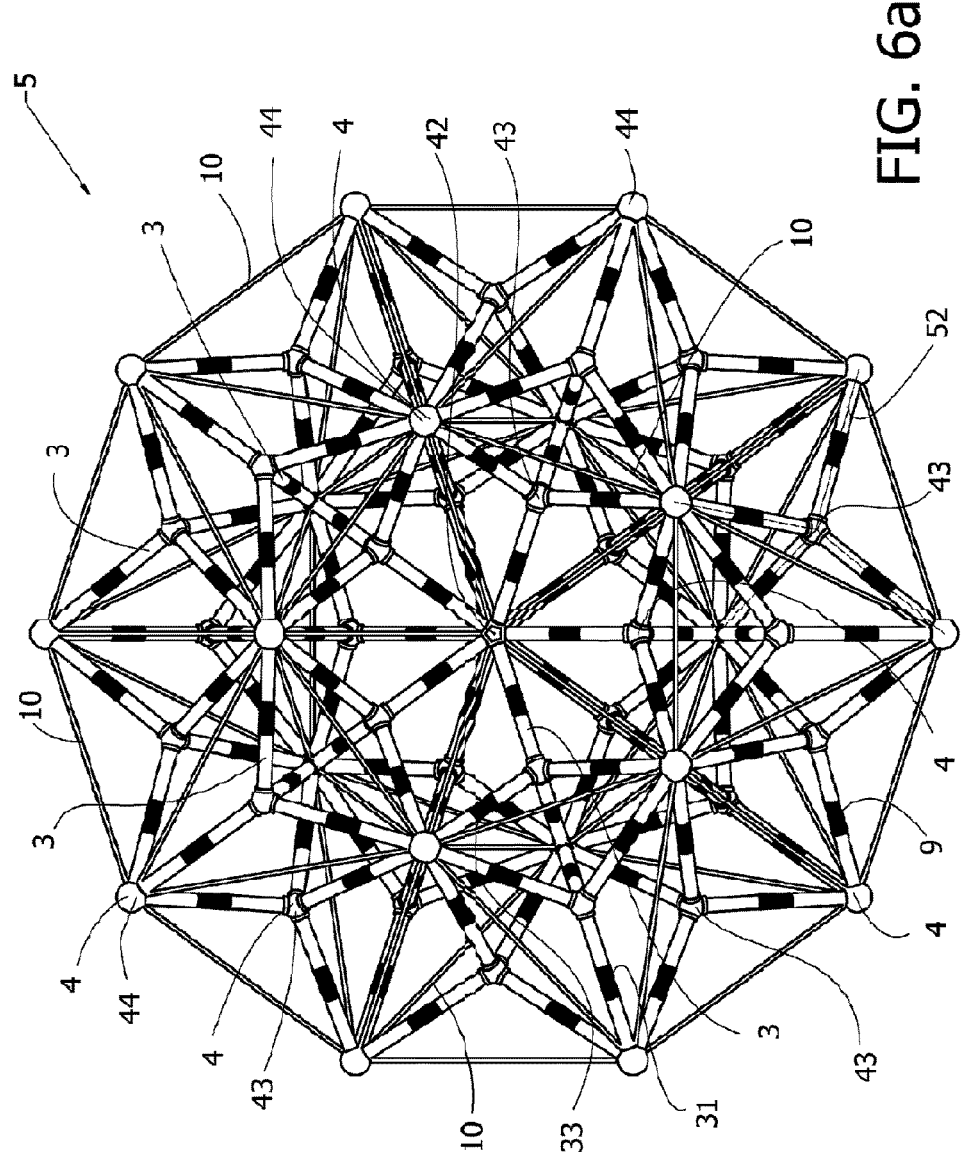
FIGS. 6a and 6b show, respectively in top and isometric view, still another compliant frame structure comprising a combination of linear generators and substantial rigid thread elements, thereby defining a plurality of second tetrahedron modules.
Figure 6B:
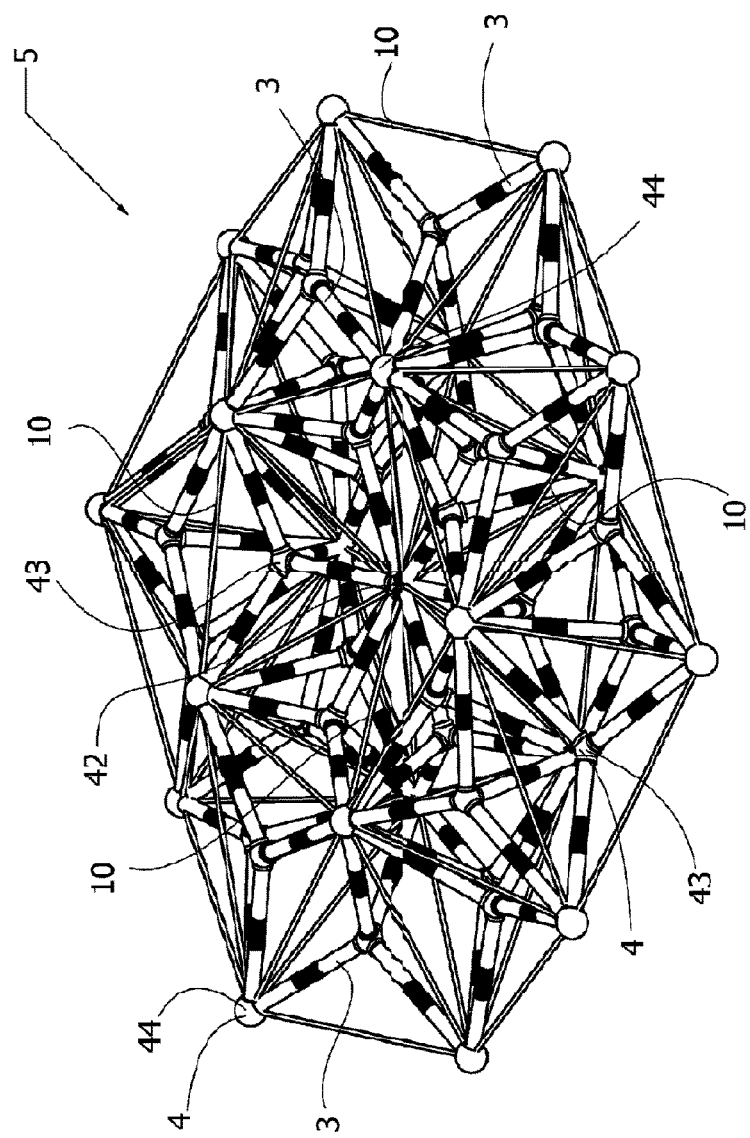

FIGS. 6a and 6b show another type of compliant frame structure 5 comprising a combination of linear generators 3 as described above and substantially rigid thread elements 10. The linear generators 3 are arranged in the compliant frame structure in a tetrahedral geometry with groups of linear generators extending from a common pivot joint 43. These groups of linear generators define corners 44 of a tetrahedron and the substantially rigid thread elements 10, extend between these corners. By the linear generators being tetrahedrally fixed to a common pivot joint 43, a frame structure similar to that of carbon atoms in a diamond lattice is provided. The linear generators and the thread elements, together define second tetrahedron modules 52, as indicated by the dotted lines in FIG. 6a.

The thread elements 10 contribute to controlling the compression and elongation of the linear generators, as well as their spatial orientation. When the compliant frame structure is enclosed by an outer flexible membrane, and the inner space is depressurised, the thread elements 10 will experience a force normal to its longitudinal direction by the inward seeking outer flexible membrane. Consequently, the thread elements will curve, forcing the corners 44 of the tetrahedron further towards the common pivot joint 43. Hereby the linear generators may be forced from an extended condition into the neutral position. The linear generators and/or common pivot joints in a tetrahedron module have some restriction in their degrees of freedom to ensure that the geometric shape of the module remains a tetrahedron. This is an important feature so that the compliant frame structure does not manipulate into unwanted shapes. In FIGS. 6a and 6b, the thread elements 10 are shown to be separate from the outer flexible membrane. However, the thread elements may also be integrated in the outer flexible membrane.

Figure 7A:
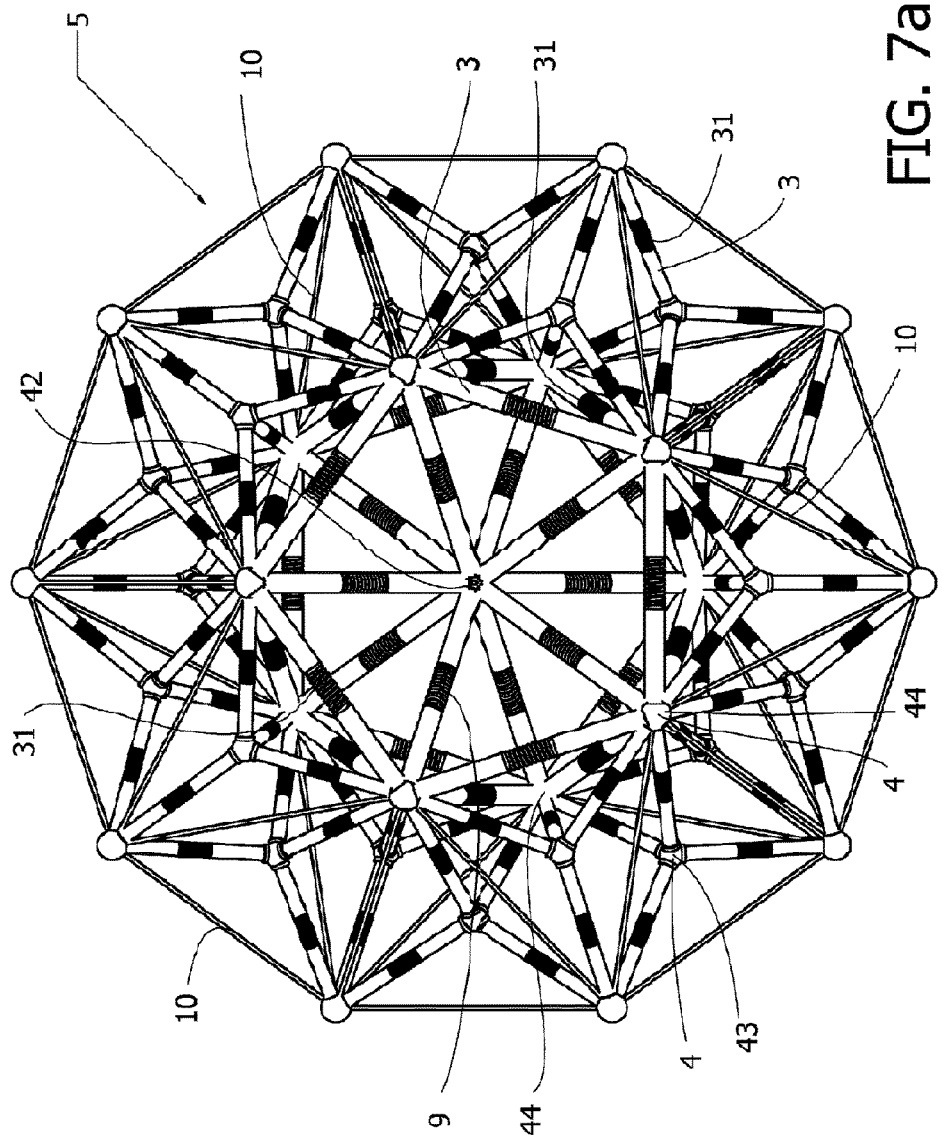
FIG. 7a shows a compliant frame structure wherein a centre part comprises first tetrahedron modules and an outer part comprises second tetrahedron modules.
Figure 7C:
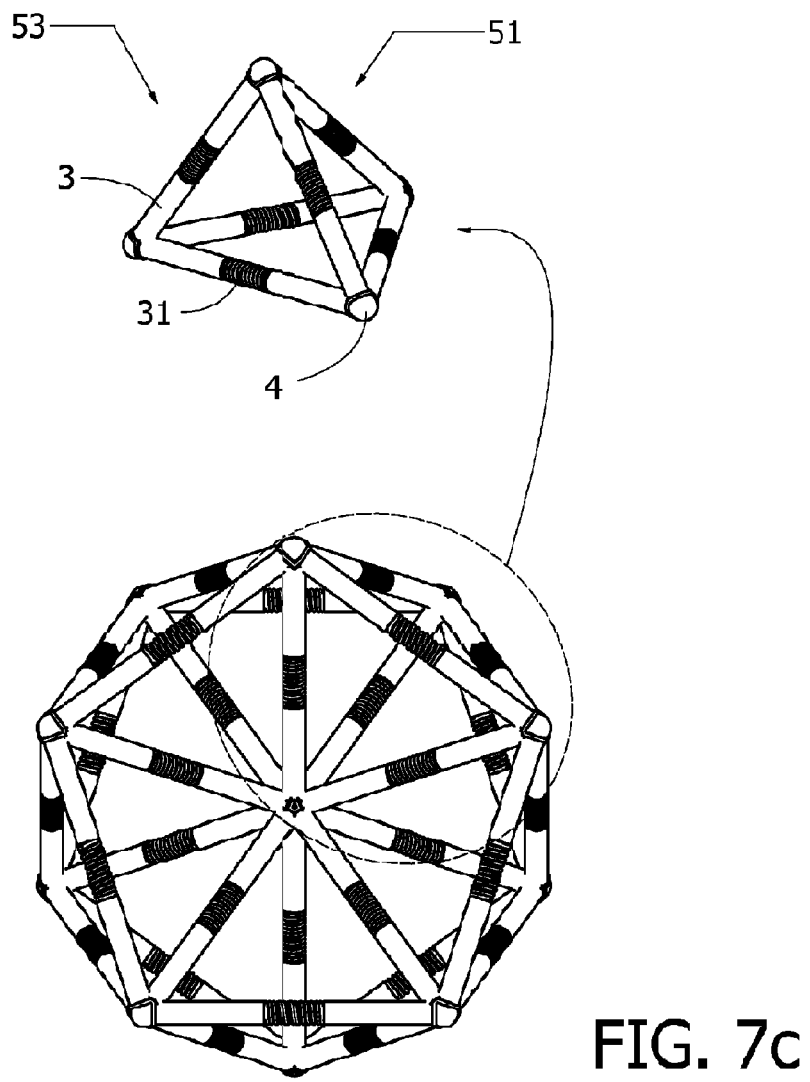

FIGS. 7a, 7b and 7c show still another compliant frame structure 5 according to an aspect of the invention. This compliant frame structure comprises first tetrahedron modules 51 arranged in a centre part of the compliant frame structure 5 and second tetrahedron module 52 arranged in the periphery of the compliant frame structure. The use of first tetrahedron modules 51 results in a compliant frame structure requiring fewer linear generators and the use of the second tetrahedron modules 52 provides a compliant frame structure wherein destructive forces acting perpendicularly to the extension of the linear generators are reduced or avoided. A hybrid compliant frame structure 5 comprising both a structural part based on linear generators 3 alone and a structural part based on a combination of shorter linear generators 3 and thread elements 10, is thus provided.

As shown in FIG. 9, the first and the second tetrahedron modules may be provided with individual module membranes 66, thereby constituting frame modules 53. These frame modules may be combined in a number of different ways to provide a floatable compliant vessel. The frame modules provide increased freedom of design and floatable compliant vessels of varying geometry may be constructed based on such frame modules 53.

Manufacturing of a floating compliant vessel 2 may be done based on well-known standard components. These standard components may be manufactured anywhere in the world and easily shipped to an assembly location near the installation site of one or more floatable compliant vessels. At the assembly location the standard components are relatively simply put together to provide a floatable compliant vessel and a wave energy conversion apparatus. As the floatable compliant vessel is self-supporting and buoyant, the wave energy conversion apparatus may be towed to the installation site, e.g. offshore. Installation may thus be done without the need for heavy lifting equipment. At the installation site the floatable compliant vessel is secured using appropriate fixation means 100 which may have been prepared in advanced. Further the floatable compliant vessel can be connected to necessary infrastructure, e.g. via a power transmission line 101 extending from the floatable compliant vessel, as previously described. The floatable compliant vessel may then be depressurised and submerged to the appropriate draft.

Also, the buoyancy of the compliant vessel may be controlled by buoyancy controlling means associated with the floatable compliant vessel. The buoyancy may be controlled in relation to the weather conditions, and it is envisaged that the floatable compliant vessel may be partly of fully submerged to protect the wave energy conversion apparatus under extreme weather conditions. The flexible membrane may be constructed with a hatch access to the inner space of the floatable compliant vessel for service and maintenance of the wave energy converter apparatus.

According to one aspect of the invention, a wave energy conversion apparatus may be used in a number of different configurations. For example, a wave energy conversion apparatus may be installed as a stand-alone apparatus comprising a dedicated power circuit with a dedicated power conversion system and infrastructure for controlling the apparatus and connecting the apparatus to the grid. In another embodiment, a plurality of wave energy conversion apparatus are installed near each other, in what may be denoted a wave park or the like. In such a system, each of the wave energy conversion apparatuses may be connected in a common power circuit with a common power conversion system and infrastructure for controlling the apparatuses and connecting the apparatuses to the grid.

Further, the wave energy conversion apparatus described above may be used for generating waves by reversing the mode of operation of the linear generators. By supplying a power input to the linear generators, such as a pressurised hydraulic fluid, the linear generators may have the functionality of linear actuators providing a power output. The movement of the linear generators changes the geometry of the compliant vessel 2 whereby waves may be generated by a compliant vessel.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wave energy conversion apparatus (1) for converting wave energy into a power output, comprising:
   a floatable semi-submersible compliant vessel (2) comprising:
      a plurality of linear generators (3) having ends (32) which are interconnected at a plurality of pivot joints (4) to provide a compliant frame structure (5), the plurality of linear generators being configured to produce a power output by being respectively compressed and elongated thereby changing the relative positions of the pivot joints,
      an outer flexible membrane (6) supported by and enclosing the compliant frame structure thereby defining an inner air filled space (7) of the floatable compliant vessel,
      a power circuit (8) arranged within the inner space and operationally connected to the linear generators to receive the power output generated by the linear generators, and
wherein the floatable compliant vessel is adapted to be manipulatable by the action of waves, acting on the outer flexible membrane between a steady-state condition wherein the linear generators are in neutral positions and a manipulated condition wherein at least some of the linear generators are compressed or elongated, and wherein the floatable compliant vessel is provided with spring back means (9) constantly forcing the linear generators towards their neutral positions and thus the floatable compliant vessel towards the steady-state condition.

2. A wave energy conversion apparatus according to claim 1, wherein the spring back means is provided by at least some of the plurality of linear generators comprising a spring back mechanism (31) forcing the linear generators towards their neutral position.

3. A wave energy conversion apparatus according to claim 1, wherein the inner space of the floatable compliant vessel is substantially air tight and depressurised whereby the compliant frame structure is subject to a compression force by the outer flexible membrane urging the linear generators into a neutral position.

4. A wave energy conversion apparatus according to claim 1, wherein each of the linear generators are connected with multiple other linear generators at the pivot joints to provide a repetitive closed compliant frame structure.

5. A wave energy conversion apparatus according to claim 1, wherein the linear generators are linear hydraulic pumps (300) generating a power output in the form of a circulating, pressurized hydraulic fluid which is fed into the power circuit, and the wave energy conversion apparatus further comprising a power conversion system adapted to convert the pressurised hydraulic fluid into electrical power.

6. A wave energy conversion apparatus according to claim 5, wherein the power circuit comprises a hydraulic pipe system (81) in fluid communication with each of the linear hydraulic pumps, the hydraulic pipe system being configured to supply a hydraulic fluid to an inlet of the linear hydraulic pumps and to receive a pressurised hydraulic fluid from an outlet of each of the linear hydraulic pumps.

7. A wave energy conversion apparatus according to claim 1, wherein the power circuit comprises a power conversion system (83) for converting the power output generated by the plurality of linear generators into another energy form.

8. A wave energy conversion apparatus according to claim 1, wherein the outer flexible membrane is displaceably arranged in relation to the compliant frame structure, allowing points of contact (61) between the compliant frame structure and the outer flexible membrane to shift.

9. A wave energy conversion apparatus according to claim 1, wherein the outer flexible membrane comprises multiple sections (62, 63, 64) of varying material properties with regard to density, elasticity and/or flexibility.

10. A wave energy conversion apparatus according to claim 1, wherein at least some of the plurality of linear generators are arranged in the compliant frame structure defining a plurality of first tetrahedron modules (51).

11. A wave energy conversion apparatus according to claim 1, wherein at least some of the plurality of linear generators are arranged in the compliant frame structure in a tetrahedral geometry having groups of linear generators extending from a common pivot joint (43).

12. A wave energy conversion apparatus according to claim 11, wherein the groups of linear generators extending from the common pivot joint defines corners (44) of a tetrahedron and a plurality of substantial rigid thread elements (10) extends between these corners, thereby defining a plurality of second tetrahedron modules (52).

13. A wave energy conversion apparatus according to claim 10, wherein each of the first and/or second tetrahedron modules defines a frame module (53) provided with a module membrane (66) arranged to enclose each of the first and/or second tetrahedron modules, and wherein the compliant frame structure comprises a plurality of interconnected frame modules.

14. A system for converting wave energy into a power output, comprising: a plurality of wave energy conversion apparatuses (1) according to claim 1, and a common power conversion system operable connected to the plurality of wave energy conversion apparatuses and adapted to convert the power output of the plurality of wave energy conversion apparatuses.

15. Use of a wave energy conversion apparatus according to claim 1 for generating waves by supplying a power input to the linear generators and controlling the mutual elongation and compression of the linear generators.

16. A wave energy conversion apparatus according to claim 2, wherein the inner space of the floatable compliant vessel is substantially air tight and depressurised whereby the compliant frame structure is subject to a compression force by the outer flexible membrane urging the linear generators into a neutral position.

17. A wave energy conversion apparatus according to claim 12, wherein each of the first and/or second tetrahedron modules defines a frame module (53) provided with a module membrane (66) arranged to enclose each of the first and/or second tetrahedron modules, and wherein the compliant frame structure comprises a plurality of interconnected frame modules.

18. A wave energy conversion apparatus according to claim 2, wherein each of the linear generators are connected with multiple other linear generators at the pivot joints to provide a repetitive closed compliant frame structure.

19. A wave energy conversion apparatus according to claim 3, wherein each of the linear generators are connected with multiple other linear generators at the pivot joints to provide a repetitive closed compliant frame structure.

* * * * *